(12) United States Patent
Kolman et al.

(10) Patent No.: US 9,729,525 B1
(45) Date of Patent: Aug. 8, 2017

(54) SECURE DATA ANALYTICS

(71) Applicants: Eyal Kolman, Tel Aviv (IL); Alon Kaufman, Herut (IL)

(72) Inventors: Eyal Kolman, Tel Aviv (IL); Alon Kaufman, Herut (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/753,453

(22) Filed: Jun. 29, 2015

(51) Int. Cl.
*H04L 29/06* (2006.01)
*G06F 17/30* (2006.01)

(52) U.S. Cl.
CPC .... *H04L 63/0471* (2013.01); *G06F 17/30477* (2013.01); *G06F 17/30864* (2013.01); *H04L 63/0457* (2013.01); *H04L 63/0853* (2013.01)

(58) Field of Classification Search
CPC .......................... G06F 2221/2107; G06F 21/10
USPC ....................................................... 713/165
See application file for complete search history.

(56) References Cited

U.S. PATENT DOCUMENTS

| | | | |
|---|---|---|---|
| 7,107,445 B2 | 9/2006 | Trapp et al. | |
| 7,856,100 B2 | 12/2010 | Wang et al. | |
| 8,010,782 B2 | 8/2011 | Kerschbaum | |
| 8,281,148 B2 | 10/2012 | Tuyls et al. | |
| 8,862,895 B2 | 10/2014 | Rieffel et al. | |
| 8,925,075 B2 | 12/2014 | Krendelev et al. | |
| 9,191,196 B2 | 11/2015 | Raykova et al. | |
| 9,197,637 B2 | 11/2015 | Sy et al. | |
| 9,213,764 B2* | 12/2015 | Kerschbaum | G06F 17/30864 |
| 9,215,219 B1 | 12/2015 | Krendelev et al. | |
| 9,276,734 B2 | 3/2016 | Naganuma | |
| 2010/0106980 A1* | 4/2010 | Kerschbaum | H04L 9/3013 |
| | | | 713/193 |
| 2013/0097417 A1 | 4/2013 | Lauter et al. | |
| 2013/0254532 A1 | 9/2013 | Raykova et al. | |
| 2015/0244517 A1 | 8/2015 | Nita | |

OTHER PUBLICATIONS

Yehuda Lindell; Benny Pinkas, May 6, 2008, Secure Multiparty Computation for Privacy-Preserving Data Mining; pp. 1-39.*

* cited by examiner

*Primary Examiner* — Anthony Brown
(74) *Attorney, Agent, or Firm* — BainwoodHuang

(57) ABSTRACT

Techniques of performing queries involve adapting a query to whether query data is encrypted. Along these lines, a data sensitivity policy defines which types of data is encrypted prior to storage in a data analytics database and which other types of data remain unencrypted. When a client formulates a query, the client encrypts a query input and then conceals the encrypted query input and query function to form concealed query logic. When the concealed query logic is received by a data analytics server, the data analytics server determines whether the query data to be input into the concealed query logic is encrypted or unencrypted. If the query data is unencrypted, then the concealed query logic is unconcealed and the query input unencrypted so that the data analytics server may evaluate the query function without concealment to produce a query result.

16 Claims, 4 Drawing Sheets

SECURE DATA ANALYTICS

BACKGROUND

Data analytics is a process of querying large amounts of data to discover hidden patterns and other useful information within the data. For example, a credit card company may receive data in connection with thousands of transactions per hour. The credit card company may have an understanding of certain patterns of usage that may constitute fraudulent behavior, e.g., the same user attempting to use a credit card at the same time, at two locations distant from each other. The credit card company may then perform queries on the data to find out which users are following such patterns of usage.

Conventional approaches to performing data analytics queries involve storing data in a database operated by a third party. To continue the above example, the credit card company may submit queries to the third party database in order to discover evidence of fraudulent behavior. The third party applies its own algorithms to perform a data analytics process that produces identifiers of users exhibiting fraudulent behavior and sends those identifiers to the credit card company. The credit card company may then take remedial action against the users, e.g., suspending their credit cards.

SUMMARY

Unfortunately, there are deficiencies with the above-described conventional approaches to performing data analytics queries. For example, there are potential liabilities that come with receiving sensitive information such as credit card transaction data in the raw form needed to perform data analytics. Along these lines, some clients of a third party service that operates a third-party server would rather not send sensitive information in raw form. Further, certain regulations prohibit the export of such sensitive information to third parties. sensitive information before sending it to the third party service.

One way to address this issue is to have a client of the third party service encrypt the data. In fact, there are methods by which data analytics queries may be performed on encrypted data, such as fully homomorphic encryption. However, the large scale of the computations involved in a typical data analytics query makes performing queries on fully encrypted query data so computationally expensive as to be rendered impractical.

In contrast to the conventional approaches to performing data analytics queries in which the data is either fully unencrypted or fully encrypted, improved techniques of performing queries involve adapting a query to whether query data is encrypted. Along these lines, a data sensitivity policy defines which types of data are encrypted prior to storage in a data analytics database and which other types of data remain unencrypted. When a client formulates a query, the client encrypts a query input and then conceals the encrypted query input and query function to form concealed query logic. When the concealed query logic is received by a data analytics server, the data analytics server determines whether the query data to be input into the concealed query logic is encrypted or unencrypted. If the query data is unencrypted, then the concealed query logic is unconcealed and the query input unencrypted so that the data analytics server may evaluate the query function without concealment to produce a query result. However, if the query data is encrypted, then the data analytics server performs a multi-party computation using the concealed query logic and encrypted query data to produce the query result.

Advantageously, the improved techniques allow big data analytics queries to be made quickly without compromising sensitive data. Because a typical policy requires only a small percentage of data be treated as sensitive data to be encrypted, the amount of expensive multi-party computations needed in any query is small so that the increase in time or resources needed to protect sensitive data in a query is also small.

One embodiment of the improved techniques is directed to a method of performing a query. The method includes receiving, by processing circuitry, bits representing concealed query logic, the concealed query logic being generated from a query function and encrypted query input, the encrypted query input being produced by an encryption operation on query input. In response to unencrypted query data being input into the concealed query logic, the method also includes performing an unconcealing operation on the concealed query logic to produce the query function and the query input, and inputting the unencrypted query data and the query input into the second query function to produce a readable query result. In some arrangements, in response to encrypted query data being input into the concealed query logic, the method further includes producing, by the processing circuitry, a concealed query result based on the encrypted query data and the concealed query logic, the concealed query result, when unconcealed, producing an encrypted query result.

Additionally, some embodiments are directed to an apparatus constructed and arranged to perform a query. The apparatus includes a network interface, memory and controlling circuitry coupled to the memory. The controlling circuitry is constructed and arranged to carry out a method of performing a query.

Further, some embodiments are directed to a computer program product having a non-transitory, computer-readable storage medium which stores executable code, which when executed by a controlling circuitry, causes the controlling circuitry to perform a method of performing a query.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of performing queries involve adapting a query to whether query data is encrypted. Along these lines, a data sensitivity policy defines which types of data is encrypted prior to storage in a data analytics database and which other types of data remain unencrypted. When a client formulates a query, the client encrypts a query input and then conceals the encrypted query input and query function to form concealed query logic. When the concealed query logic is received by a data analytics server, the data analytics server determines whether the query data to be input into the concealed query logic is encrypted or unencrypted. If the query data is unencrypted, then the concealed query logic is unconcealed and the query input unencrypted so that the data analytics server may evaluate the query function without concealment to produce a query result.

Advantageously, the improved techniques allow big data analytics queries to be made quickly without compromising sensitive data. Because a typical policy requires only a small percentage of data be treated as sensitive data to be encrypted, the amount of expensive multi-party computations needed in any query is small so that the increase in time or resources needed to protect sensitive data in a query is also small.

Figure 1:
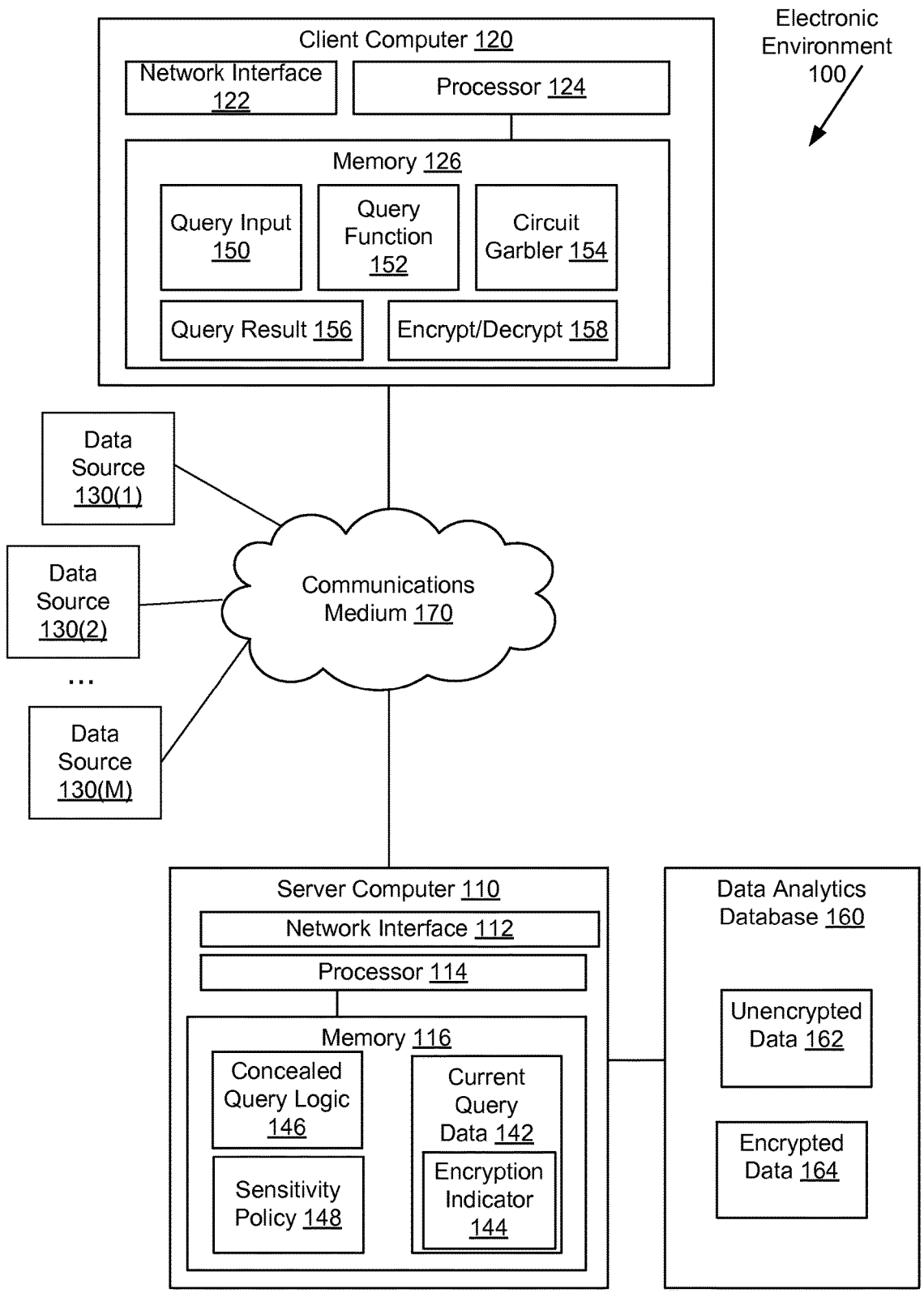
FIG. 1 is a block diagram illustrating an example electronic environment in which the improved technique can be carried out.

FIG. 1 shows an example electronic environment 100 in which embodiments of the improved techniques hereof can be practiced. The electronic environment 100 includes a client computer 120, a server computer 110, data sources 130(1), 130(2), . . . , 130(M), and a communications medium 170.

The client computer 120 is constructed and arranged to submit a query to the server computer 110 in a secure fashion. As illustrated in FIG. 1, the client computer 120 includes a network interface 122, a processor 124, and memory 126. The network interface 122 includes, for example, adapters, such as SCSI target adapters and network interface adapters, for converting electronic and/or optical signals received from the communications medium 170 to electronic form for use by the client computer 120. The processor 124 includes one or more processing chips and/or assemblies. In a particular example, the processor 124 includes multi-core CPUs. The memory 126 includes both volatile memory (e.g., RAM), and non-volatile memory, such as one or more ROMs, disk drives, solid state drives, and the like. The processor 124 and the memory 126 together form control circuitry, which is constructed and arranged to carry out various functions as described herein.

The memory 126 is also constructed and arranged to store various data, for example, query input 150, query function 152, and query result 156. The memory 126 is further constructed and arranged to store a variety of software constructs realized in the form of executable instructions, such as circuit garbler 154 and an encryption/decryption module 158. When the executable instructions are run by the processor 124, the processor 124 is caused to carry out the operations of the software constructs. Although certain software constructs are specifically shown and described, it should be understood that the memory 126 typically includes many other software constructs, which are not shown, such as an operating system, various applications, processes, and daemons, for example.

The circuit garbler 154 represents the query function 152 as a set of logic gates and garbles, or conceals, the circuits by rearranging entries of the truth tables representing the gates to produce the concealed query logic 146. For example, when the query function 152 involves a lookup in a data analytics database 160, the query function 152 then includes a test for equality that may be expressed in terms of inverted XOR gates. The circuit garbler 154 replaces the truth tables of the inverted XOR gates with 128-bit binary strings and rearranges the order of the entries of the truth tables to disguise the nature of the logic gate presented to the server computer 110. The server computer 110 may then evaluate the concealed query logic 146 according to Yao's protocol when the query data is encrypted.

The encryption/decryption module 158 may implement any type of scheme used to encrypt query inputs prior to submission within concealed query logic 146. In the examples provided herein, the encryption/decryption module 158 may implement a symmetric key scheme because the client 120 performs both encryption and decryption. In some arrangements, the encryption/decryption module 158 implements an asymmetric public/private key scheme.

The server computer 110 is constructed and arranged to access large amounts of unencrypted data 162 and encrypted data 164 stored in the data analytics database 160. For example, the server computer 110 may be part of a family of servers operated by third party data analytics service provider such as EMC, Inc. of Hopkinton, Mass. As illustrated in FIG. 1, the server computer 110 includes a respective network interface 112, a processor 114, and memory 116. The network interface 112 includes, for example, adapters, such as SCSI target adapters and network interface adapters, for converting electronic and/or optical signals received from the communications medium 170 to electronic form for use by that server computer 110. The processor 114 includes one or more processing chips and/or assemblies. In a particular example, the processor 114 includes multi-core CPUs. The memory 116 includes both volatile memory (e.g., RAM), and non-volatile memory, such as one or more ROMs, disk drives, solid state drives, and the like. The processor 114 and the memory 116 together form control circuitry, which is constructed and arranged to carry out various functions as described herein.

The memory 116 is also constructed and arranged to store various data, for example, current query data 142 and sensitivity policy 148. Each memory 116 is also constructed and arranged to store a variety of software constructs realized in the form of executable instructions, such as concealed query logic 146. When the executable instructions are run by the processor 114, the processor 114 is caused to carry out the operations of the software constructs. Although certain software constructs are specifically shown and described, it should be understood that the memory 114 typically includes many other software constructs, which are not shown, such as an operating system, various applications, processes, and daemons, for example.

The concealed query logic 146 represents respective instructions to carry out query operations according to the query function 152 generated by the client computer 120. The evaluation of the concealed query logic 146 is performed according to Yao's protocol. The concealed query logic 146 takes the form of logic gates having input and output wires. The logic gates in turn are represented by truth tables that map possible binary values of the input wires to possible binary values of the output wire. The logic 146 is concealed, or garbled, because the possible binary values encapsulated in the truth tables of the logic gates are replaced with random binary strings of a fixed length (e.g., 128 bits) and the order of the entries of the truth tables scrambled so that the servers 110 do not know what any particular truth table represents.

The sensitivity policy 148 contains a set of rules for deciding which data from data sources 130 is encrypted prior to storage in the data analytics database 160. For example, transaction data may contain transaction records that have a number of fields. One rule of the sensitivity policy 148 may dictate that a credit card number may be encrypted, but a transaction date may be left unencrypted.

The data analytics database 160 is constructed and arranged to stored data in unencrypted 162 and encrypted 164 forms according to the policy 148 stored on the server 110. It should be understood that encrypted data 164 is encrypted according to keys generated by the encrypt/decrypt module 158 on client computer 120.

Each data source 130(1), 130(2), . . . , 130(M) is any electronic device capable of storing raw query data and splitting the raw query data into shares to be stored on each of the server computers 110. For example, when the client computer 120 is operated by a credit card company, the data sources 130 may be merchants that process credit card transactions, within which are credit card transaction data.

The communications medium 170 provides network connections among the client computer 120, the server computer 110, and the data sources 130(1), . . . , 130(M). Communications medium 170 may implement any of a variety of protocols and topologies that are in common use for communications over the Internet. Furthermore, communications medium 170 may include various components (e.g., cables, switches/routers, gateways/bridges, etc.) that are used in such communications.

During an example operation, each of the data sources 130 provides data to the data analytics database 160 on a continual basis. As the data are received by the server computer 110, the server computer applies rules of the policy 148 to determine which data to encrypt prior to storage in the database 160. When the rules determine that data received by the server 110 are to be encrypted, the data are encrypted according to an encryption scheme that is not known to the server 110. The server 110 then stores both unencrypted data 162 and encrypted data 164 in the database 160.

At some point in time, the client 120 formulates a query. The query contains the query input 150 and a query function 152. The client 120 encrypts the query input 150 according to the encryption scheme 158. Further, the client 120 breaks the query function 152 into a set of logic gates, or truth tables. Each bit of the query input 150 is one of two binary inputs into a logic gate, the other being each corresponding bit of query data. Then the client 120 then garbles, or conceals each logic gate by replacing each bit of the truth tables with a random, 128-bit binary string. Further details of such a replacement are discussed in connection with FIG. 3.

In some arrangements, the client 120 may also provide additional information to each truth table so that, when the server 110 inputs unencrypted data 162 to the concealed logic 146, the concealed logic 146 reveals the unconcealed truth table and corresponding unencrypted input bit. For example, the information may simply be instructions to send the concealed logic 146 back to the client 110, which then reverses its concealing steps to provide the unconcealed truth table and the input bit from the unencrypted query input 150 and then sends the unconcealed logic and input back to the server 110 for evaluation.

The client 120 then sends the concealed query logic 146 to the server computer 110 over the communications medium 170. Upon receipt, the server computer inputs a bit of the query data 142 into the concealed query logic 146. In some arrangements, the query data 142 contains another bit 144 that indicates whether the query data 142 is encrypted or unencrypted. If the query data 142 is encrypted, then the server computer 110 evaluates the concealed query logic 146 according to Yao's protocol as described in connection with FIG. 3. If however the query data 142 is unencrypted, the concealed query logic 146 is unconcealed to reveal the underlying truth table and query input. In either case, the server evaluates the logic and provides a query result.

Figure 2:
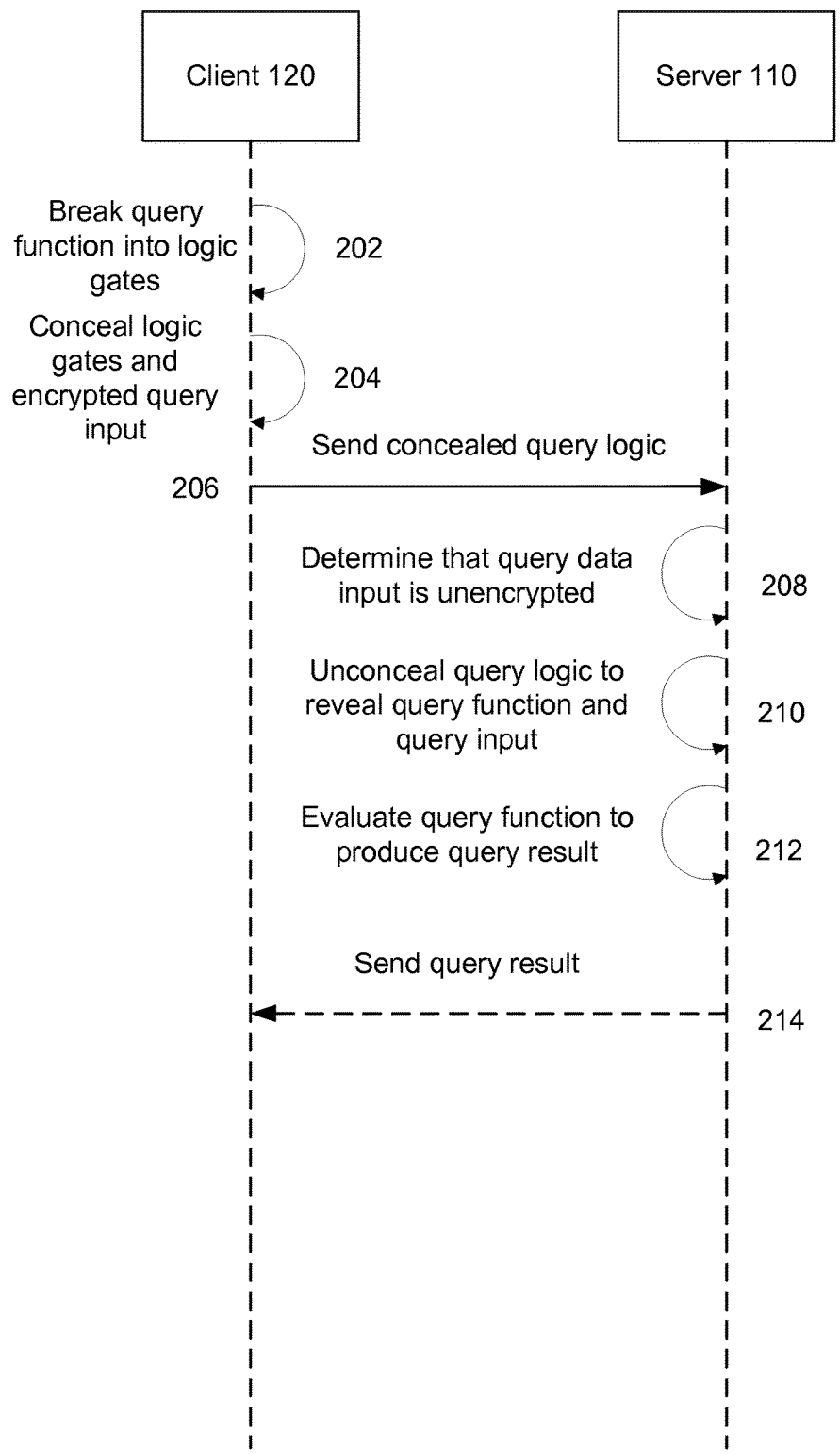
FIG. 2 is a sequence diagram illustrating an example query within the electronic environment illustrated in FIG. 1.

FIG. 2 is a sequence diagram that describes an example secure data analytics operation according to the improved techniques. At 202, the client 120 breaks up a query including a query function into truth tables. For example, is the query is a lookup, the query function may include a test for equality. Such a test may be expressed in terms of inverted XOR gates.

At 204, the client 120 encrypts query input 150 using a symmetric key provided in the encryption/decryption module 158. The client then provides a bit of the encrypted query input as an input to a truth table. The client then conceals the truth table and bit input to produce concealed query logic 146. Details about the concealment, or garbling, are provided in connection with FIG. 3. The result of the concealment is that the server computer 110 will not be able to determine neither the input nor the truth table unless the concealed logic 146 is unconcealed.

At 206, the client computer 110 sends the concealed query logic 146 to the server computer 120.

At 208, upon receiving the concealed query logic 146, the server computer 110 retrieves current query data 142 from the data analytics database 160. The server computer 160 determines whether this current data 142 is encrypted or not. In this example, the server computer 110 determines that the current data 142 is unencrypted.

At 210, upon the determination that the current data 142 is unencrypted, the server computer 110 initiates an unconcealment process to unconceal the concealed query logic 146. For example, the server computer may send a message to the client computer 120 requesting the corresponding unconcealed query logic. The message may contain the concealed query logic 146 so that the client 120 may identify the query logic to unconceal. As part of the unconcealment process, the client 120 unencrypts the query input 150.

At 212, the server computer evaluates the unconcealed query logic, i.e., the truth tables given the query input bits and corresponding query data bits and produces a query result.

At 214, the server computer sends the query result to the client computer.

Figure 3:
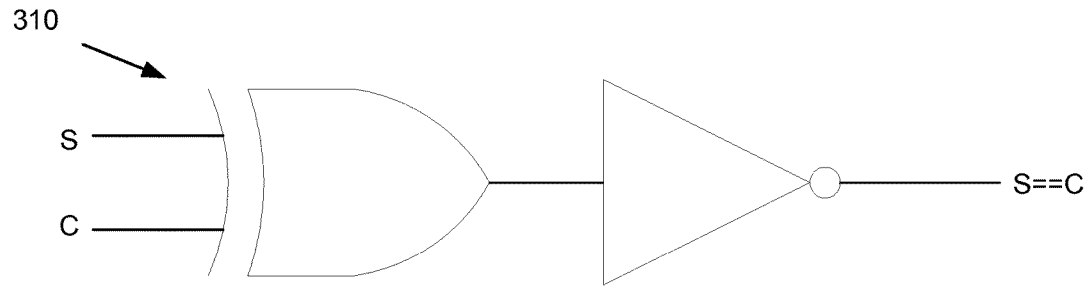
FIG. 3 is a block diagram illustrating an example circuit evaluation using Yao's protocol within the electronic environment illustrated in FIG. 1.

FIG. 3 illustrates a specific example of Yao's protocol of evaluating a garbled, or concealed, logic gate that is part of the concealed query logic 146. In particular, FIG. 3 shows an inverted XOR gate 310 used in equality tests that are a part of the query operation illustrated in FIG. 2. Inverted XOR gate 310 has two input wires S and C for a server computer 110 and the client computer 120, respectively and an output wire that indicates whether the input wires S and C contain the same bit value. The inverted XOR gate 310 has a truth table 320.

As part of the garbling process, i.e., Yao's protocol, the server computer 120 replaces each possible bit of the server wire and the client wire with a respective randomly-generated, 128-bit binary string to form an encrypted truth table 330. Specifically, the 128-bit representation of the 0 bit on the server wire is denoted as $w_0^S$, the 128-bit representation of the 1 bit on the server wire is denoted as $w_1^S$, the 128-bit representation of the 0 bit on the client wire is denoted as $w_0^C$, the 128-bit representation of the 1 bit on the client wire is denoted as $w_1^C$, the 128-bit representation of the 0 bit on the output wire is denoted as $w_0^O$, and the 128-bit representation of the 1 bit on the output wire is denoted as $w_1^O$.

Moreover, the server computer 120 encrypts the bit strings of the output wire $w_0^O$ and $w_1^O$ using a symmetric encryption scheme. The key associated with this scheme is a combination of the bit string of the server wire and the bit string of the client wire. That is, instead of two possible values on the output wire, there are four possible values corresponding to the four possible combinations of values of the server and client input wires.

The server computer 120 then randomly rearranges the rows of the encrypted truth table 330 to form the garbled truth table 340. In this way, the client computer 110 has no way to identify the logic gate from the table. Further, once the client computer 110 obtains its bit string for the client input wire, it may obtain the 128-bit string of the output wire without knowing the other bit strings on the output wire.

When the server computer 120 provides the query function 152 to the client computer 110, the server computer 120 provides garbled truth tables such as garbled truth table 340. In addition, the server computer 120 provides the 128-bit string for each of its input wires.

The string that is input on the client wire is determined by oblivious transfer. The idea behind oblivious transfer is that the client computer 120 does not know which of the two possible bit strings the server computer 110 inputs on the client input wire and that the server computer 110 does not recognize the other possible input bit string. An example of oblivious transfer is as follows:

The client computer 120 generates (i) a key pair [d, (N, e)] and (ii) two random bit strings $x_0$ and $x_1$. The server computer 120 sends N, e, $x_0$, and $x_1$ to the server computer 110. The value d is a secret that the server computer 110 will not know.

The server computer 110 knows which binary value b it needs to input, which the client computer 120 will not know. The server computer 110 also generates a secret random number k. The server computer 110 generates the number $v=(x_b+k^e) \bmod N$ and sends v to the client computer 120.

The client computer 120 computes $k_0=(v-x_0)^d \bmod N$ and $k_1=(v-x_1)^d \bmod N$, which will not be known to the client computer 110. The client computer 120 then computes $w_0^{C'}=w_0^C+k_0$ and $w_1^{C'}=w_1^C+k_1$ and sends $w_0^{C'}$ and $w_1^{C'}$ to the server computer 110.

The server computer 110 then reveals $w_b^C=w_b^{C'}-k$. The other string reveals nothing upon subtracting k, so the server computer 110 learns nothing about $w_{1-b}^C$. Meanwhile, the client computer 120 knows nothing about b.

For a complicated circuit, there will be many gates with one oblivious transfer per input. The oblivious transfer is the most computationally demanding part of the risk score computation because of the exponentiation operations. However, the oblivious transfers may be performed in parallel.

Once oblivious transfer has completed, the server computer 110 decrypts the value of the output wire using the given value of the server input wire and the obtained value of the client input wire as keys. The server computer 110 is only able to decrypt one of the possible values of the output wire, and the other three possible values will result in noise. One way that the client computer may recognize the correct output value by concatenating a string of 0's to each possible output value. The keys will decrypt the string of 0's as well only for the correct output wire value.

It should be understood that the server computer 110 still does not know what the binary value of the output wire of a gate actually is, but only the binary string representing that value. However, the server computer 110 may feed this new binary string as input into another gate.

Yao's protocol also demands that the number of rounds (typically 2-4) be constant. That is, the number of rounds should not depend on the size of the circuit, i.e., the number of gates.

Figure 4:
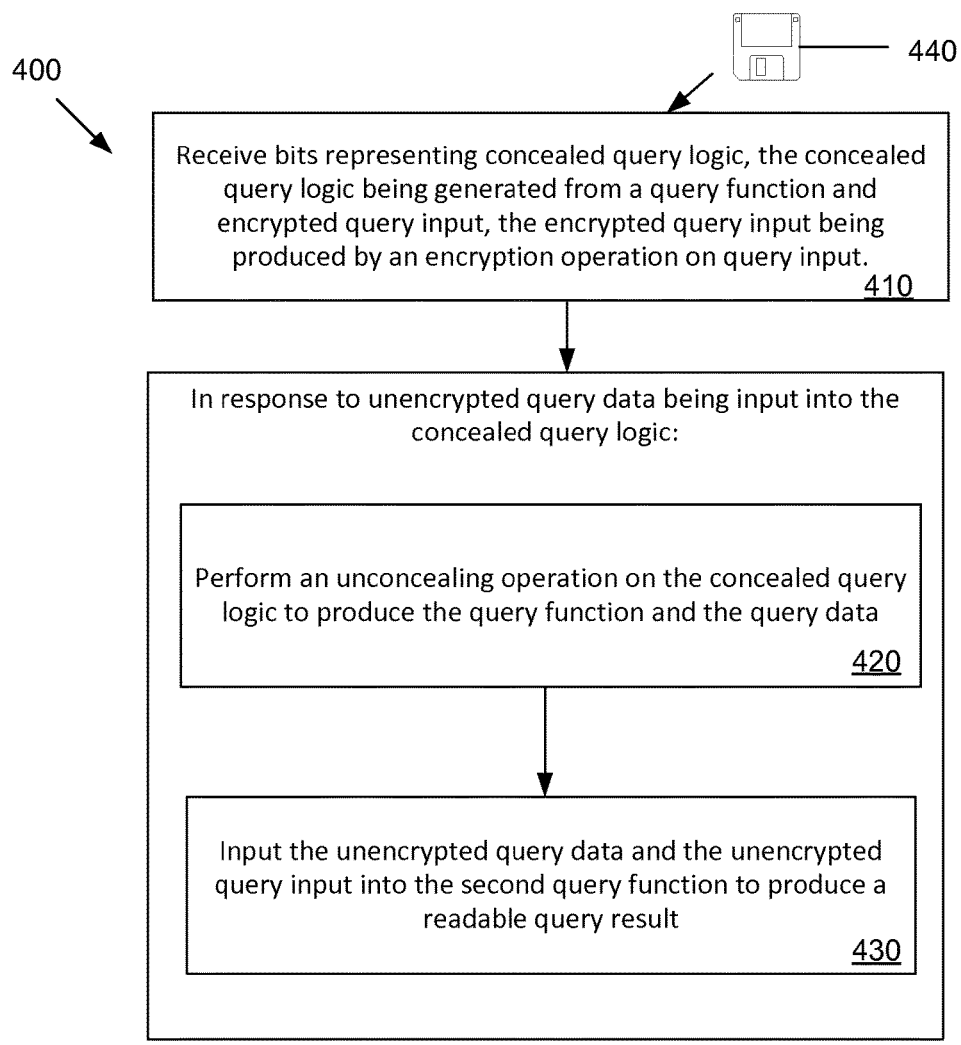
FIG. 4 is a flow chart illustrating a method of carrying out the improved technique within the electronic environment illustrated in FIG. 1.

FIG. 4 illustrates a method 400 of performing a query. The method 400 may be performed by the software constructs described in connection with FIG. 1, which reside in the memory 116 of the server computer 110 and the memory 126 of the server computer 110 and are run by the processors 124 and 114.

At 410, a server computer receives bits representing concealed query logic, the concealed query logic being generated from a query function and encrypted query input, the encrypted query input being produced by an encryption operation on query input.

At 420, the server computer, in response to unencrypted query data being input into the concealed query logic, performs an unconcealing operation on the concealed query logic to produce the query function and the query input.

At 430, the server computer inputs the unencrypted query data and the query input into the second query function to produce a readable query result.

Improved techniques of performing queries involves adapting a query to whether query data is encrypted. Along these lines, a data sensitivity policy defines which types of data is encrypted prior to storage in a data analytics database and which other types of data remain unencrypted. When a client formulates a query, the client encrypts a query input and then conceals the encrypted query input and query function to form concealed query logic. When the concealed query logic is received by a data analytics server, the data analytics server determines whether the query data to be input into the concealed query logic is encrypted or unencrypted. If the query data is unencrypted, then the concealed query logic is unconcealed and the query input unencrypted so that the data analytics server may evaluate the query function without concealment to produce a query result.

Having described certain embodiments, numerous alternate embodiments or variations can be made. For example, there are a number of ways that the concealed query logic 146 may be unconcealed. As discussed above, the server computer 110 sends a message to the client computer requesting unconcealed query logic. Alternatively, the client computer 120 may know ahead of time to expect unencrypted query data 162 or encrypted query data 164 and not conceal or conceal the query logic accordingly.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 440 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of performing a query, the method comprising:
    receiving, by processing circuitry, bits representing concealed query logic, the concealed query logic being generated from a query function and encrypted query input, the encrypted query input being produced by an encryption operation on query input; and
    in response to unencrypted query data being input into the concealed query logic:
        performing an unconcealing operation on the concealed query logic to produce the query function and the query input; and
        inputting the unencrypted query data and the query input into the second query function to produce a readable query result; and
    in response to encrypted query data being input into the concealed query logic, producing, by the processing circuitry, a concealed query result based on the encrypted query data and the concealed query logic, the concealed query result, when unconcealed, producing an encrypted query result.

2. A method as in claim 1, further comprising, prior to receiving the bits representing the concealed query logic, providing each of a set of query data with an encryption bit indicating whether that query datum is encrypted.

3. A method as in claim 1, further comprising, prior to receiving the bits representing the concealed query logic:
    receiving (i) data from external data sources and (ii) a data sensitivity policy indicating conditions under which data is encrypted;
    encrypting a portion of the data received from the external data sources according to the conditions indicated by the data sensitivity policy.

4. A method as in claim 1, wherein the query function is represented by a set of truth tables, each of the set of truth tables having entries, each entry of that truth table having a value of a server bit, a value of an input bit, and a value of an output bit,
    wherein the concealed query logic includes, for each of the set of truth tables representing the query function, a respective concealed truth table, the respective concealed truth table replacing the values of the server bits and the client bits of that truth table with random binary strings and replacing the values of the output bits with encrypted binary strings, each of the encrypted binary strings resulting from a respective encryption operation on one of two possible output bitstrings, and
    wherein performing an unconcealing operation on the concealed query logic includes, for each of the set of truth tables, producing that truth table from the respective concealed truth table.

5. A method as in claim 4, wherein producing each of the set of truth tables from the respective concealed truth tables includes:
    sending a message to a client computer, the message including (i) the bits representing the concealed query logic and (ii) an indicator indicating that the query data input into the concealed query logic is unencrypted; and
    receiving, from the client computer, the query function and the query input.

6. An electronic system constructed and arranged to perform a query, the electronic system comprising:
    a client computer; and
    a server computer including a network interface, memory, and controlling circuitry coupled to the memory, the controlling circuitry being constructed and arranged to:
        receive bits representing concealed query logic, the concealed query logic being generated from a query function and encrypted query input, the encrypted query input being produced by an encryption operation on query input; and
        in response to unencrypted query data being input into the concealed query logic:
            perform an unconcealing operation on the concealed query logic to produce the query function and the query input; and
            input the unencrypted query data and the query input into the second query function to produce a readable query result; and
        in response to encrypted query data being input into the concealed query logic, produce, by the processing circuitry, a concealed query result based on the encrypted query data and the concealed query logic, the concealed query result, when unconcealed, producing an encrypted query result.

7. An electronic system as in claim 6, wherein the controlling circuitry is further constructed and arranged to, prior to receiving the bits representing the concealed query logic, provide each of a set of query data with an encryption bit indicating whether that query datum is encrypted.

8. An electronic system as in claim 6, wherein the controlling circuitry is further constructed and arranged to, prior to receiving the bits representing the concealed query logic:
    receive (i) data from external data sources and (ii) a data sensitivity policy indicating conditions under which data is encrypted;
    encrypt a portion of the data received from the external data sources according to the conditions indicated by the data sensitivity policy.

9. An electronic system as in claim 6, wherein the query function is represented by a set of truth tables, each of the set of truth tables having entries, each entry of that truth table having a value of a server bit, a value of an input bit, and a value of an output bit,
    wherein the concealed query logic includes, for each of the set of truth tables representing the query function, a respective concealed truth table, the respective concealed truth table replacing the values of the server bits and the client bits of that truth table with random binary strings and replacing the values of the output bits with encrypted binary strings, each of the encrypted binary strings resulting from a respective encryption operation on one of two possible output bitstrings, and
    wherein the controlling circuitry constructed and arranged to perform an unconcealing operation on the concealed query logic is further constructed and arranged to, for each of the set of truth tables, produce that truth table from the respective concealed truth table.

10. An electronic system as in claim 9, wherein the controlling circuitry constructed and arranged to produce each of the set of truth tables from the respective concealed truth tables is further constructed and arranged to:
   send a message to a client computer, the message including (i) the bits representing the concealed query logic and (ii) an indicator indicating that the query data input into the concealed query logic is unencrypted; and
   receive, from the client computer, the query function and the query input.

11. A computer program product including a non-transitory, computer-readable storage medium which stores executable code, which when executed by a client computer, causes the client computer to perform a method of performing a query, the method comprising:
   receiving, by processing circuitry, bits representing concealed query logic, the concealed query logic being generated from a query function and encrypted query input, the encrypted query input being produced by an encryption operation on query input; and
   in response to unencrypted query data being input into the concealed query logic:
      performing an unconcealing operation on the concealed query logic to produce the query function and the query input; and
      inputting the unencrypted query data and the unencrypted query input into the second query function to produce a readable query result; and
   in response to encrypted query data being input into the concealed query logic, producing, by the processing circuitry, a concealed query result based on the encrypted query data and the concealed query logic, the concealed query result, when unconcealed, producing an encrypted query result.

12. A computer program product as in claim 11, wherein the method further comprises, prior to receiving the bits representing the concealed query logic, providing each of a set of query data with an encryption bit indicating whether that query datum is encrypted.

13. A computer program product as in claim 11, wherein the method further comprises, prior to receiving the bits representing the concealed query logic:
   receiving (i) data from external data sources and (ii) a data sensitivity policy indicating conditions under which data is encrypted;
   encrypting a portion of the data received from the external data sources according to the conditions indicated by the data sensitivity policy.

14. A computer program product as in claim 11, wherein the query function is represented by a set of truth tables, each of the set of truth tables having entries, each entry of that truth table having a value of a server bit, a value of an input bit, and a value of an output bit,
   wherein the concealed query logic includes, for each of the set of truth tables representing the query function, a respective concealed truth table, the respective concealed truth table replacing the values of the server bits and the client bits of that truth table with random binary strings and replacing the values of the output bits with encrypted binary strings, each of the encrypted binary strings resulting from a respective encryption operation on one of two possible output bitstrings, and
   wherein performing an unconcealing operation on the concealed query logic includes, for each of the set of truth tables, producing that truth table from the respective concealed truth table.

15. A computer program product as in claim 14, wherein producing each of the set of truth tables from the respective concealed truth tables includes:
   sending a message to a client computer, the message including (i) the bits representing the concealed query logic and (ii) an indicator indicating that the query data input into the concealed query logic is unencrypted; and
   receiving, from the client computer, the query function and the query input.

16. A method as in claim 1, wherein the query function is represented by a set of tables, each of the set of tables having entries, each entry of that table having multiple input values, and an output value;
   wherein the concealed query logic includes, for each of the set of tables representing the query function, a respective concealed table, the respective concealed table replacing the input values of that table with random strings and replacing the output values with encrypted strings, each of the encrypted strings resulting from a respective encryption operation on one of multiple possible outputs; and
   wherein performing an unconcealing operation on the concealed query logic includes, for each of the set of tables, producing that table from the respective concealed table.

* * * * *